United States Patent
Ngai

(10) Patent No.: US 9,954,927 B2
(45) Date of Patent: Apr. 24, 2018

(54) METHOD FOR MANAGING MULTIPLE WINDOWS ON A SCREEN FOR MULTIPLE USERS, AND DEVICE AND SYSTEM USING THE SAME

(71) Applicant: Hong Kong Applied Science and Technology Research Institute Company Limited, Hong Kong (HK)

(72) Inventor: Yat Cheung Ngai, Hong Kong (HK)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 666 days.

(21) Appl. No.: 14/604,773

(22) Filed: Jan. 26, 2015

(65) Prior Publication Data

US 2016/0216850 A1    Jul. 28, 2016

(51) Int. Cl.
    *G06F 3/048*     (2013.01)
    *G09B 5/00*      (2006.01)
    (Continued)

(52) U.S. Cl.
    CPC .............. *H04L 67/02* (2013.01); *G06F 3/048* (2013.01); *G06F 9/451* (2018.02); *G09B 5/00* (2013.01); *G09B 5/06* (2013.01)

(58) Field of Classification Search
    None
    See application file for complete search history.

(56) References Cited

U.S. PATENT DOCUMENTS 5,487,143 A  *  1/1996  Southgate ............. G06F 3/0481
                                                        715/790
7,327,376 B2    2/2008  Shen
(Continued)

FOREIGN PATENT DOCUMENTS

CN          1893590 A     1/2007
CN       102053795 A      5/2011
(Continued)

OTHER PUBLICATIONS

Title: Calculating # or Rows and Columns. Publisher: StackOverflow.com. Publication Date: Jun. 16, 2011. URL: https://stackoverflow.com/questions/6377362/calculating-or-rows-and-columns.*
Office Action issued from the State Intellectual Property Office of the People's Republic of China on Apr. 1, 2017.
Second Office Action issued from the State Intellectual Property Office of the People's Republic of China on Nov. 1, 2017.

*Primary Examiner* — Abdullah Al Kawsar
*Assistant Examiner* — David V Luu
(74) *Attorney, Agent, or Firm* — Spruson & Ferguson (Hong Kong) Limited

(57) ABSTRACT

Real-time managing multiple display windows on a screen for multiple users each allowed to request reserving an area on the screen and each having a priority value indicating a level of right to use the screen is considered. In a method, the screen is partitioned into grid-area units. Upon receiving a request from a requesting user, determine a target window formed by one or more of these units to cover the area to be reserved. Whether the requesting user is permitted to use the target window is then determined. If permitted, the target window is allocated to the requesting user as a new window. If the target window overlaps any already-allocated display window, the already-allocated window is adjusted (resized/removed) to not overlap the target window. All the allocated windows are then tiled one by one in an order according to the users' priority values for maximizing the screen's usage percentage.

19 Claims, 10 Drawing Sheets

(51) Int. Cl.
　　　*G09B 5/06*　　　(2006.01)
　　　*G06F 9/451*　　(2018.01)
　　　*H04L 29/08*　　(2006.01)

(56) References Cited

U.S. PATENT DOCUMENTS

| | | |
|---|---|---|
| 2005/0183035 A1 | 8/2005 | Ringel et al. |
| 2010/0293501 A1* | 11/2010 | Russ .................. G06F 3/04886 715/803 |
| 2012/0162536 A1 | 6/2012 | Sibilsky et al. |
| 2013/0057588 A1* | 3/2013 | Leonard ................ G06F 3/0488 345/660 |
| 2013/0128118 A1 | 5/2013 | Chiang |
| 2013/0246664 A1 | 9/2013 | Zheng |
| 2014/0281340 A1* | 9/2014 | Confer .................. G06F 12/023 711/171 |

FOREIGN PATENT DOCUMENTS

| | | |
|---|---|---|
| CN | 103530083 A | 1/2014 |
| CN | 104025005 A | 9/2014 |
| WO | WO2013169070 A1 | 11/2013 |

* cited by examiner

Use scenario 1: e-learning

*Students (standard users) can use windows after permission granted by the teacher (administrator).*

| Users | Priority | Request | Window Area | | | |
|---|---|---|---|---|---|---|
| | | | Time Instant 1 | Time Instant 2 | Time Instant 3 | Time Instant 4 |
| Teacher | $P_a$ (Top) | Full Screen | 1+2 —Resized→ 2 | 2 | Removed | -- |
| Student A | $P_s$ | 1 | -- | 1 (Granted) | 1 | 1 |
| Student B | $P_s$ | 2 | -- | -- | 2 (Granted) | 2 |
| Student C | $P_c$ (<$P_s$) | 1 | -- | -- | -- | Rejected |

METHOD FOR MANAGING MULTIPLE WINDOWS ON A SCREEN FOR MULTIPLE USERS, AND DEVICE AND SYSTEM USING THE SAME

FIELD OF THE INVENTION

The present invention generally relates to managing multiple display windows on a screen by multiple users. In particular, the present invention relates to such display-window management that real-time processes a request of reserving an area on the screen even if the screen has one or more already-allocated display windows.

BACKGROUND

For a screen of moderate or large size such as a projector screen or a large television, it is possible to operate multiple display windows on the screen. In one scenario, multiple smart devices operated by different users are allowed to request setting up different windows so that different users may run a number of applications on separate windows on the same screen. Such multi-user access to the same screen has potential applications, e.g., in multi-user gaming.

It is desirable to have a technique for controlling access to or managing the screen in the presence of plural users or user devices each of which can independently request reserving an area on the screen. Most existing techniques on multiple-window management, such as those disclosed in WO2013169070A1, US20130128118A1, US20130246664A1 and US20120162536 A1, are directed to the single-user situation. In US20050183035A1 and U.S. Pat. No. 7,327,376B2, the presence of multiple users is considered in developing techniques for multiple-window management. However, the screen is statically partitioned into a fixed pattern. Each partition, being for use by one user, has a fixed size and is located at a fixed location on the screen. The techniques of US20050183035A1 and U.S. Pat. No. 7,327,376B2 are not applicable if each user has freedom to request a window with an arbitrary size and/or having a location selected by the user.

There is a need for a technique of multiple-window management in the presence of multiple users having such freedom.

SUMMARY OF THE INVENTION

An aspect of the present invention is to provide a method for real-time managing multiple display windows on a screen by a screen-managing device that is communicable with plural users. An individual user is allowed to make a request to the screen-managing device to reserve an area on the screen even if the screen has one or more display windows already allocated to one or more other users. Each of the users has a priority value indicating a level of right to use the screen.

According to the method, the screen is partitioned into a plurality of grid-area units, whereby each of the display windows is formable by one or more of the grid-area units. Upon receiving the request from a requesting user among the plural users, determine a target window formed by one or more of the grid-area units such that the target window at least covers the area specified in the request of the requesting user. Whether the requesting user is permitted to use the target window is then determined. If the requesting user is permitted to use the target window, it is required to avoid the already-allocated display windows to overlap the target window. If the target window does not overlap any already-allocated display window, the target window is allocated to the requesting user as a new window, thereby forming an updated set of allocated display windows. If the target window overlaps one or more first windows among the already-allocated display windows, the one or more first windows are adjusted (e.g. resized, removed, or relocated) so as not to overlap the target window, and thereafter the target window is allocated to the requesting user as a new window to thereby form an updated set of allocated display windows. Afterwards, the allocated display windows contained in the updated set are tiled one by one such that each display window having an original size is resized to a new size not less than the original size, or is maintained to have the original size if determined not resizable, wherein tiling the window allocated to any first user having the priority value higher than any second user's priority value is performed before tiling the window allocated to the second user where the first and the second users are among the plural users.

A screen-managing device is realizable by comprising one or more processors configured to execute a process according to the method. Preferably, the screen-managing device wirelessly receives the request from the requesting user. An electronic display system is also realizable by comprising a screen and any screen-managing device disclosed herein.

Other aspects of the present invention are disclosed as illustrated by the embodiments hereinafter.

BRIEF DESCRIPTION OF THE DRAWINGS

FIG. 2A is a start-up procedure; and FIG. 2B is a procedure for responding to a request made by a requesting user for reserving an area on the screen.

FIG. 3A illustrates partitioning of the screen into plural grid-area units for forming display windows; FIG. 3B depicts an area that the requesting user requests to reserve; FIG. 3C depicts a target window that matches the area requested to reserve; FIG. 3D illustrates existence of already-allocated windows on the screen; FIG. 3E illustrates resizing and removing already-allocated windows so as not to overlap the target window, and allocating the target window as a new window to the requesting user; and FIG. 3F illustrates tilting of allocated windows in order to maximize usage percentage of the screen.

DETAILED DESCRIPTION

As used herein in the specification and appended claims, "a user" means an entity, an agent or a person having an identity understandable by a certain computing device such that the user and the computing device are mutually communicable. The computing device may be a screen-managing device, or any electronic device having computing capability such as a computing server. The user may be an end user communicable with the computing device via a physical user device. This physical user device may be a portable terminal such as a smartphone or a tablet. Alternatively, the user may be any portable terminal communicable with the computing device. Furthermore, the user may simply be a software application having an identity understandable by the computing device. The software application may be installed in a physical user device in order to enable the software application communicable with the computing device. It is possible that multiple software applications are installed in one physical user device, so that equivalently, multiple users are present in this one physical user device.

Figure 1:
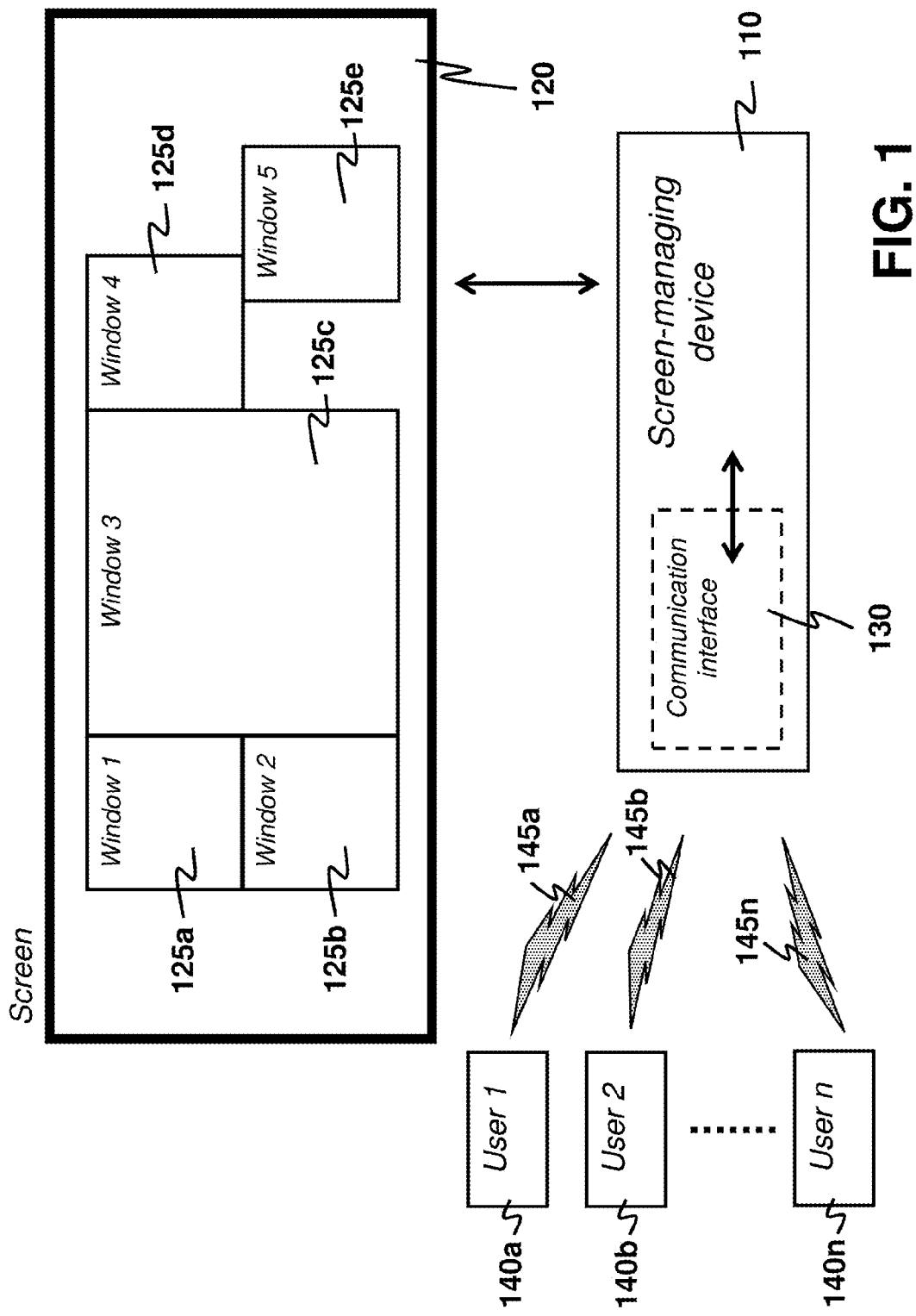
FIG. 1 depicts, in accordance with one embodiment of the present invention, an electronic display system having a screen and a screen-managing device serving requests made by multiple users.

FIG. 1 depicts an electronic display system comprising a screen 120 and a screen-managing device 110 configured to real-time process requests made by multiple users for at least creating and allocating new windows on the screen 120. The screen, for example, may be a reflector only such as a projector screen, or may be configured to emit light such as a liquid crystal display. The screen-managing device 110 comprises one or more computing processors configured to execute a computing process according to a method, as disclosed herein in the present invention, for real-time managing multiple display windows (for example, windows 125a-125e) on the screen 120. Management of the multiple display windows includes creating new windows and removing existing windows, together with other typical window-management activities such as resizing and relocating already-allocated windows.

The screen-managing device 110 is communicable with plural users 140a-140n through communication links 145a-145n. Each of the communication links 145a-145n can be wired or wireless. Note that a wireless link is preferable in many practical situations in that a user or a user device, such as a smart phone or a tablet, can be used as a remote control for the screen 120. Optionally, a communication interface 130 is included in the screen-managing device 110 to enable the screen-managing device 110 to communicate with the users 140a-140n. Advantageously, the screen-managing device 110 may configure the communication interface 130 to broadcast a current screen-content image, display-window location information, and application information to the users 140a-140n. The communication interface 130 may also be configured to handle user authentication.

Figure 2A:
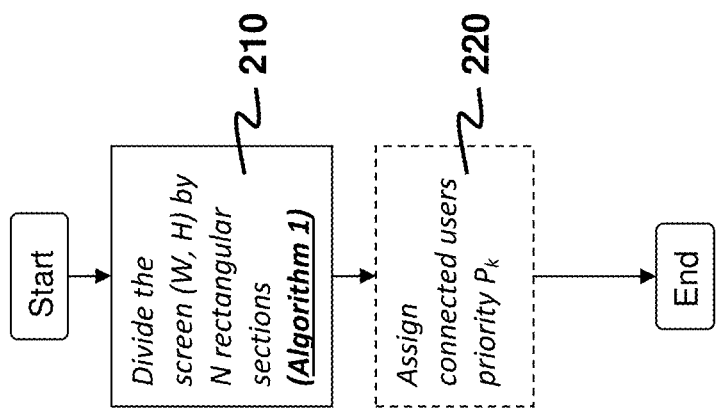
FIGS. 2A and 2B are flowcharts illustrating process flows performed by the screen-managing device in accordance with an exemplary embodiment of the present invention, where.
Figure 2B:
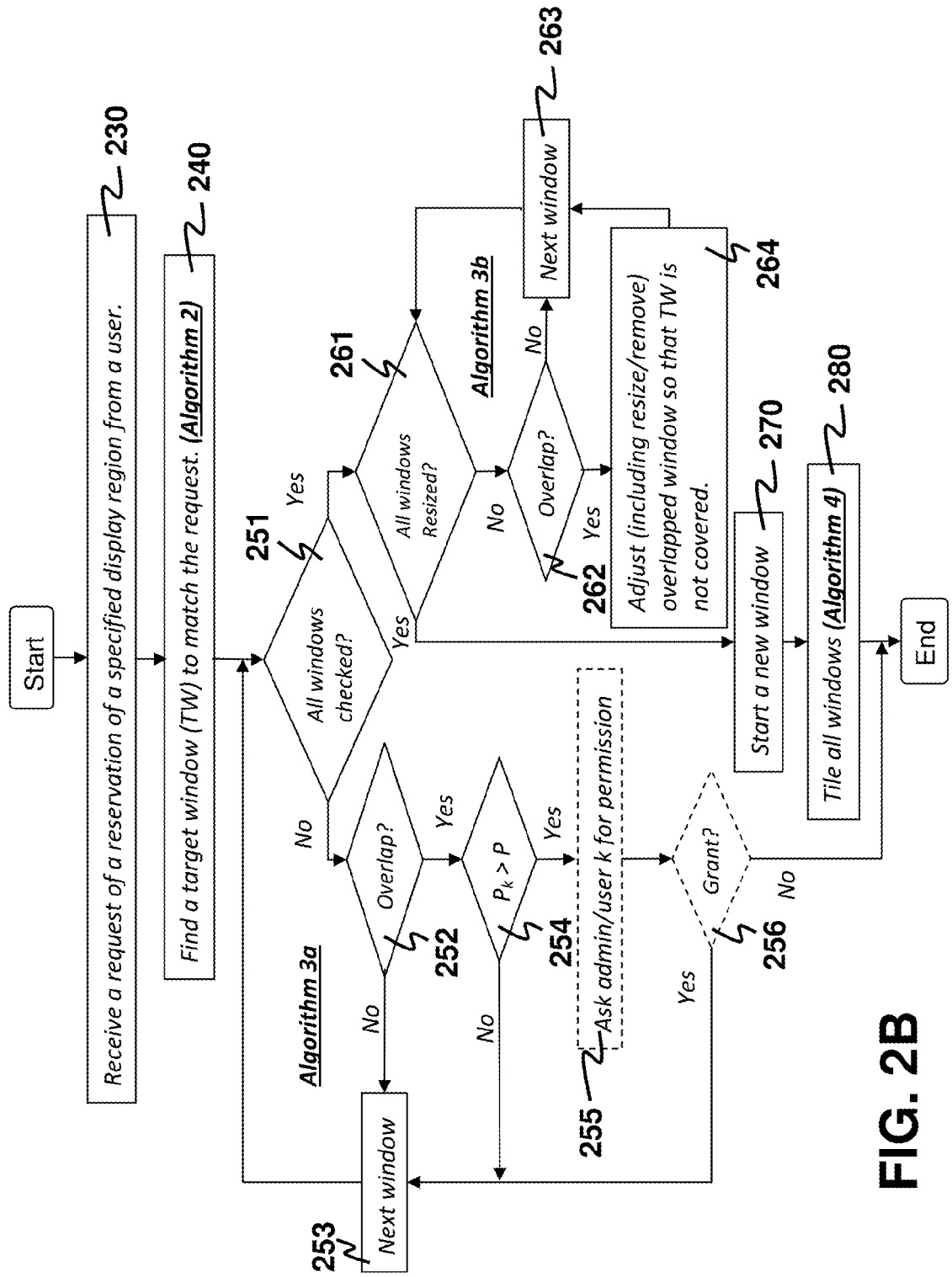

An aspect of the present invention is to provide a method for real-time managing multiple display windows on a screen by a screen-managing device that is communicable with plural users. An individual user is allowed to make a request to the screen-managing device to reserve an area on the screen even if the screen has one or more display windows already allocated to one or more other users. Each of the users has a priority value indicating a level of right to use the screen. Herein a priority value and the corresponding order of precedence among users are related as follows: a first user having a priority value higher than a second user's priority value implies that the first user takes precedence over the second user. The method is elaborated as follows with the aid of: FIGS. 2A and 2B, which illustrate process flows performed by the screen-managing device according to an exemplary embodiment of the present invention; and FIGS. 3A-3F, which provides an example illustrating the process flows of FIGS. 2A and 2B, FIG. 2A is a start-up procedure included in the method.

Figure 3A:
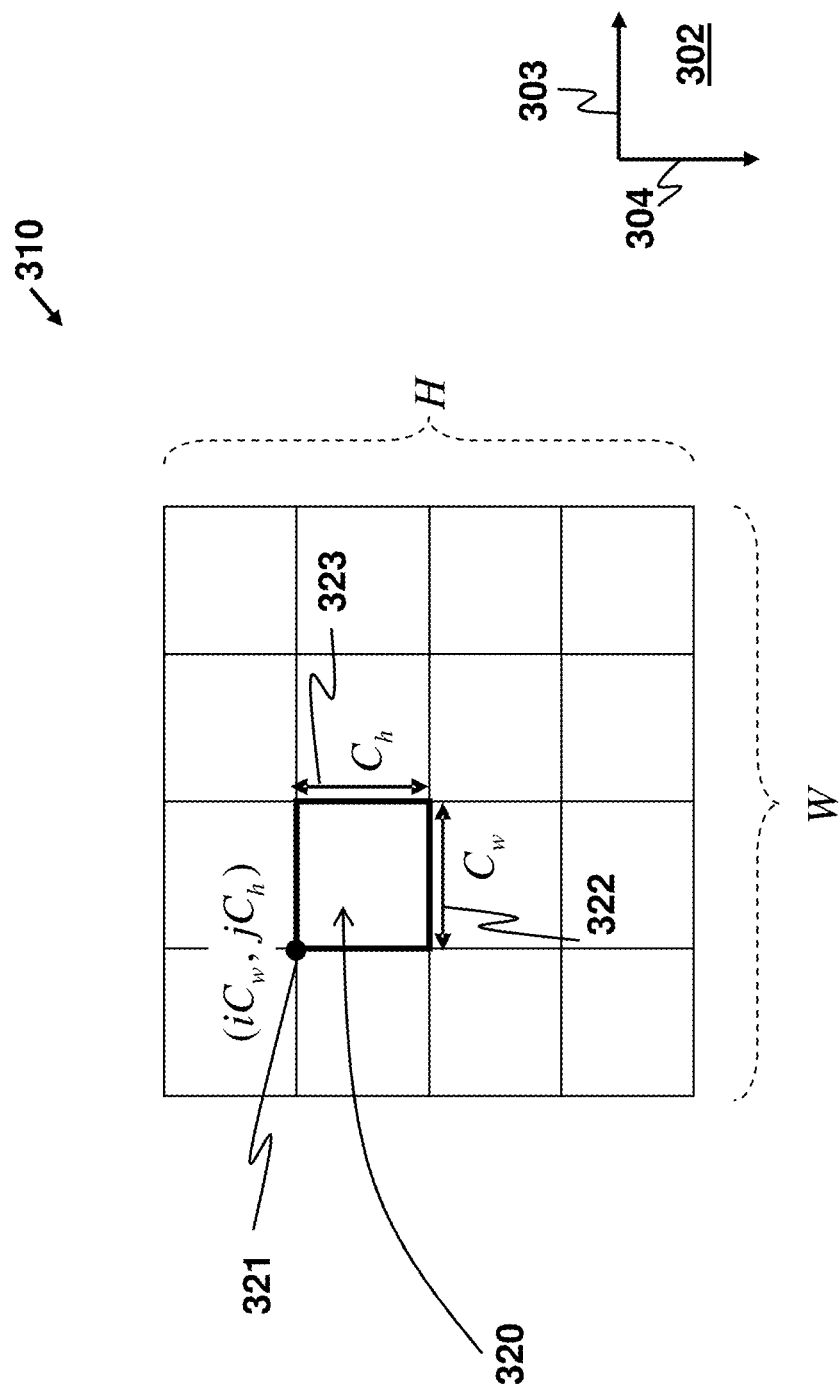
FIGS. 3A-3F is an example illustrating implementation of the procedures set forth in FIGS. 2A and 2B, where.

The screen is first partitioned into a plurality of grid-area units (step 210), whereby each of the display windows is formable by one or more of the grid-area units. FIG. 3A illustrates the partitioning of the screen by an example. A screen 310 is partitioned into a number of grid-area units, each being a rectangular section 320. All the grid-area units may be of equal or unequal size, but equal-size units are easier to be operated in practice.

In one embodiment, the partitioning of the screen 310 into multiple equal-size grid-area units each realized as the rectangular section 320 is performed according to Algorithm 1.

Herein in the specification and the appended claims, a coordinate system 302 using a reference horizontal direction 303 and a reference vertical direction 304 is employed to illustrate the techniques and algorithms disclosed herein.

Let W and H be the width and the height, respectively, of the screen 310. It is desired to partition the screen 310 into N, or about N, rectangular sections, where N is a predetermined positive integer and may be determined by the electronic display system according to many factors such as the size of the screen 310. The (i,j) th rectangular section 320, $C_{i,j}$, where i and j are non-negative integers, has a reference-location coordinate 321 given by ($iC_w$, $jC_h$), and has a width 322 of $C_w$ and a height 323 of $C_h$. In FIG. 3A, an upper leftmost coordinate is selected as the reference-location coordinate 321 for convenience although it is apparent to those skilled in that art that any other reference point on the rectangular section 320 may also be chosen.

Algorithm 1. The numbers $C_w$ and $C_h$ are computed by $$C_w = \frac{W}{M_w} \text{ and } C_h = \frac{H}{M_h},$$

where:

$$M_w = \lceil 2\sqrt{N} - \lfloor\sqrt{N}\rfloor \rceil$$

and $$M_h = \lfloor\sqrt{N}\rfloor$$

are the numbers of rectangular sections partitioning the screen 310 along the reference horizontal direction 303 and the reference vertical direction 304, respectively; $\lfloor x \rfloor$ is a floor function defined as the largest integer not greater than x; and $\lceil x \rceil$ is a ceiling function defined as the smallest integer not less than x. Valid indices i and j for forming $C_{i,j}$ are given as $i \in \{0,1, \ldots, M_w-1\}$ and $j \in \{0,1, \ldots, M_h-1\}$.

The idea of developing Algorithm 1 is that it is desirable to have $M_w$ close to $M_h$. Since the areas requested by different users may be very different in shape, flexibility in both the x- and the y-directions in selecting a suitable display window for any one user is obtained if $M_w$ is made close to $M_h$.

Refer to FIG. 2A. Optionally, each of the plural users is assigned with the priority value (step 220). The step 220 is optional in the start-up procedure in that the priority values of all the users may be time-invariant (so that the step 220 is applicable) or may be made time-varying (thereby repeating the assigning of the priority values to the users).

FIG. 2B is a procedure, included in the disclosed method, for responding to a request made by a requesting user, among the plural users, for reserving an area on the screen.

Figure 3B:
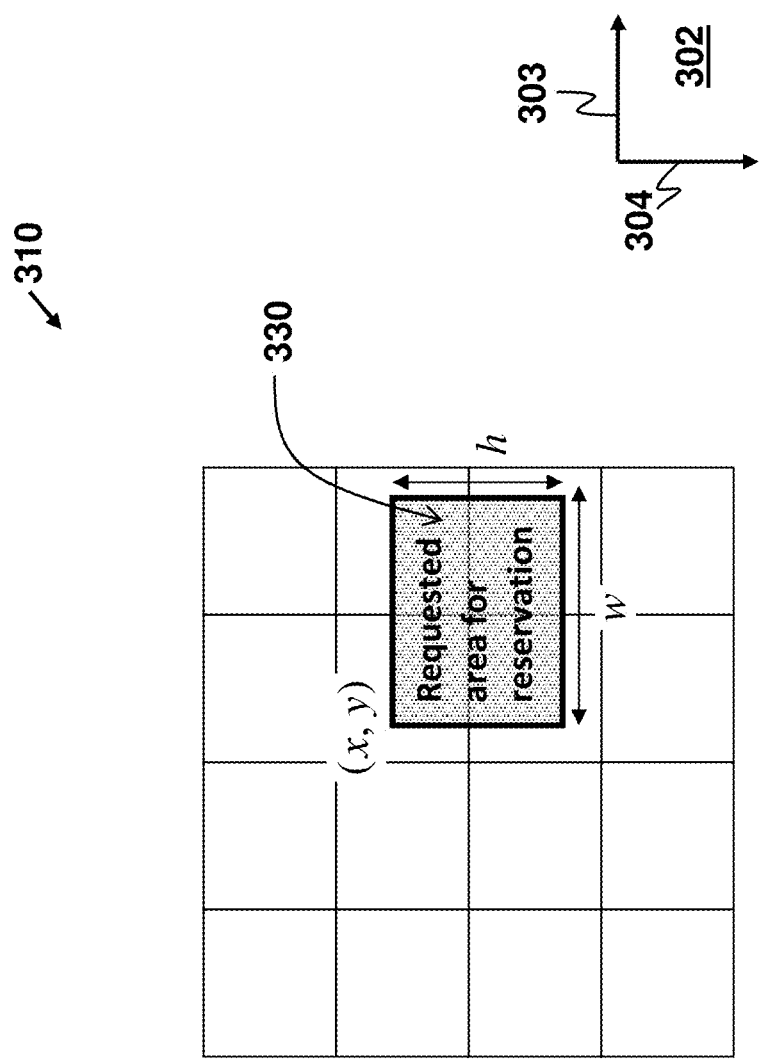
Figure 3C:
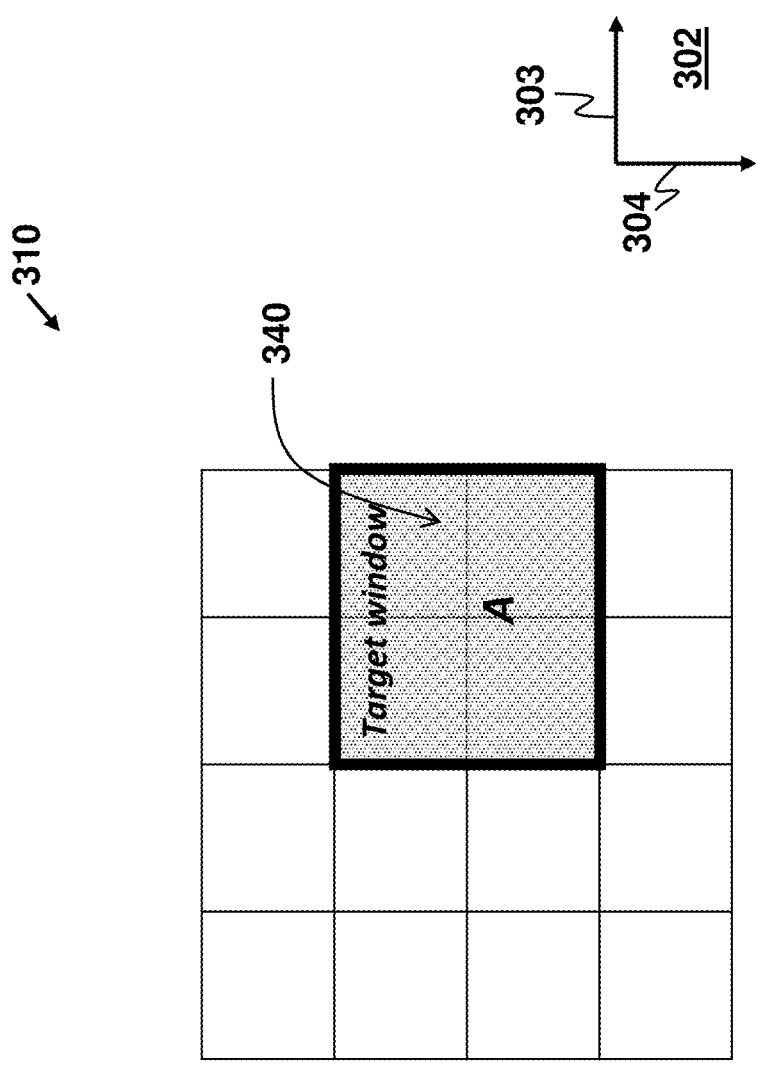

Upon receiving the request from the requesting user (step 230), determine a target window (TW) formed by one or more of the grid-area units such that the TW at least covers the area specified in the aforementioned request (step 240). FIG. 3B depicts, as an example, an area 330 that the requesting user requests to reserve, where the request specifies that the area 330 has a width w, a height h, and a reference-location coordinate (x,y). FIG. 3C depicts a TW 340 that matches the requested area 330.

In one embodiment, the TW 340 that matches the requested area 330 is determined by Algorithm 2.

Algorithm 2. Let the TW 340 be denoted as A. Then A is determined by $$A = \sum_{i \in I, j \in J} C_{i,j} \text{ where}$$

$$I = \left\{ \left\lfloor \frac{x}{C_w} \right\rfloor, \left\lfloor \frac{x}{C_w} \right\rfloor + 1, \ldots, \left\lfloor \frac{x+w}{C_w} \right\rfloor \right\} \text{ and}$$

$$J = \left\{ \left\lfloor \frac{y}{C_h} \right\rfloor, \left\lfloor \frac{y}{C_h} \right\rfloor + 1, \ldots, \left\lfloor \frac{y+h}{C_h} \right\rfloor \right\}.$$

As used herein in the specification and the appended claims, the summation sign $\Sigma$ is defined as concatenation of non-overlapping rectangular sections.

After the TW is determined in the step 240, determine whether the requesting user is permitted to use the TW. The determination is based on the priority values of the users and whether the TW overlaps any already-allocated display window. In one approach, if the TW overlaps a display window that is already allocated to another user, the priority value of this another user is consulted and whether the requesting user is permitted to use the TW is determined. This approach is collectively implemented in steps 251-256 shown in FIG. 2B. This approach may be supplemented by an additional policy that if the TW overlaps a display window already allocated to another user but the original area actually requested by this another user does not overlap the TW, the requesting user is permitted to use the TW (with, e.g., an appropriate reduction in size of the another user's display window). As will be evidenced soon, the possible occurrence that the window allocated to another user is bigger than the area requested by this another user is due to a tiling operation for display windows (step 280).

Hereinafter the determination of whether the requesting user is permitted to use the TW is elaborated by describing the steps 251-256. With the description of the steps 251-256, it will be apparent to an ordinary person skilled in the art to implement the aforementioned additional policy, which is not further elaborated hereinafter. Initially, the step 251 is performed to check whether all the windows allocated to the users have been checked. If not, then consider one unchecked window and check if it overlaps the TW in the step 252. If not, a next unchecked window, if any, is picked up in the step 253 and the step 251 is repeated. Otherwise, it indicates that the TW overlaps a window of another user having the priority value, say, $P_k$. Let P be the priority value of the requesting user. If $P_k > P$, the aforesaid another user has higher priority than the requesting user to use the screen. Hence, the requesting user is not allowed to use the TW unless an overriding permission is obtained, provided an option of asking for such permission is available as in the optional steps 255, 256. If such permission is obtained, then return to the step 253 for picking up another unchecked window, if any, for checking. If $P_k \leq P$, also go to the step 253.

In short, whether the requesting user is permitted to use the TW is determined by checking whether any one of conditions is satisfied. A first one of the conditions is that the TW does not overlap any already-allocated display window (as in the step 252). A second one of the condition is that the priority value of the requesting user is higher than the priority value of any other user having at least one already-allocated display window overlapped with the TW if the first condition is not satisfied (as in the step 254). Optionally, a third one of the conditions is that an overriding permission is obtained by the requesting user to use the target window if the second condition is not satisfied (as in the steps 255, 256).

In one embodiment, whether the requesting user is permitted to use the TW is determined by Algorithm 3a.

Algorithm 3a. Let n be the number of already-allocated display windows on the screen before finding out if the requesting user is permitted to use the TW. Among the n users having such already-allocated display windows, the k th user has the priority value $P_k$. Let $A_k$ be the display window allocated to the k th user. As mentioned above, the priority value of the requesting user is P, and the TW is A. Whether the requesting user is permitted to use the TW is determined by repeating a checking step for k=1 . . . n and identifying that the TW is grantable to the requesting user if all the n checking steps are passed. The checking step is characterized as follows: if $(A_k \cap A \neq \phi) \wedge (P_k \geq P)$ is true where $\phi$ is the null set, then reject the request made by the requesting user, else this checking step is passed.

If the requesting user is permitted to use the TW, it is required to avoid the already-allocated display windows to overlap the target window. If the TW overlaps one or more first windows among the already-allocated display windows, then adjust the one or more first windows so as not to overlap the target window (the loop of steps 262, 264, 263 and 261). Typical operations of adjusting an individual first window include resizing, removing, and relocating, this first window. Afterwards, the TW is allocated to the requesting user as a new window (step 270) to thereby form an updated set of allocated display windows. In another situation, the TW does not overlap any already-allocated display window. Then the TW is directly allocated to the requesting user as a new window (the step 270) to thereby form an updated set of allocated display windows. As an example shown in FIG. 3E, a new window 360*a*, which occupies an area the same as the area of the TW 340 in FIG. 3D, is allocated to the requesting user.

Figure 3D:
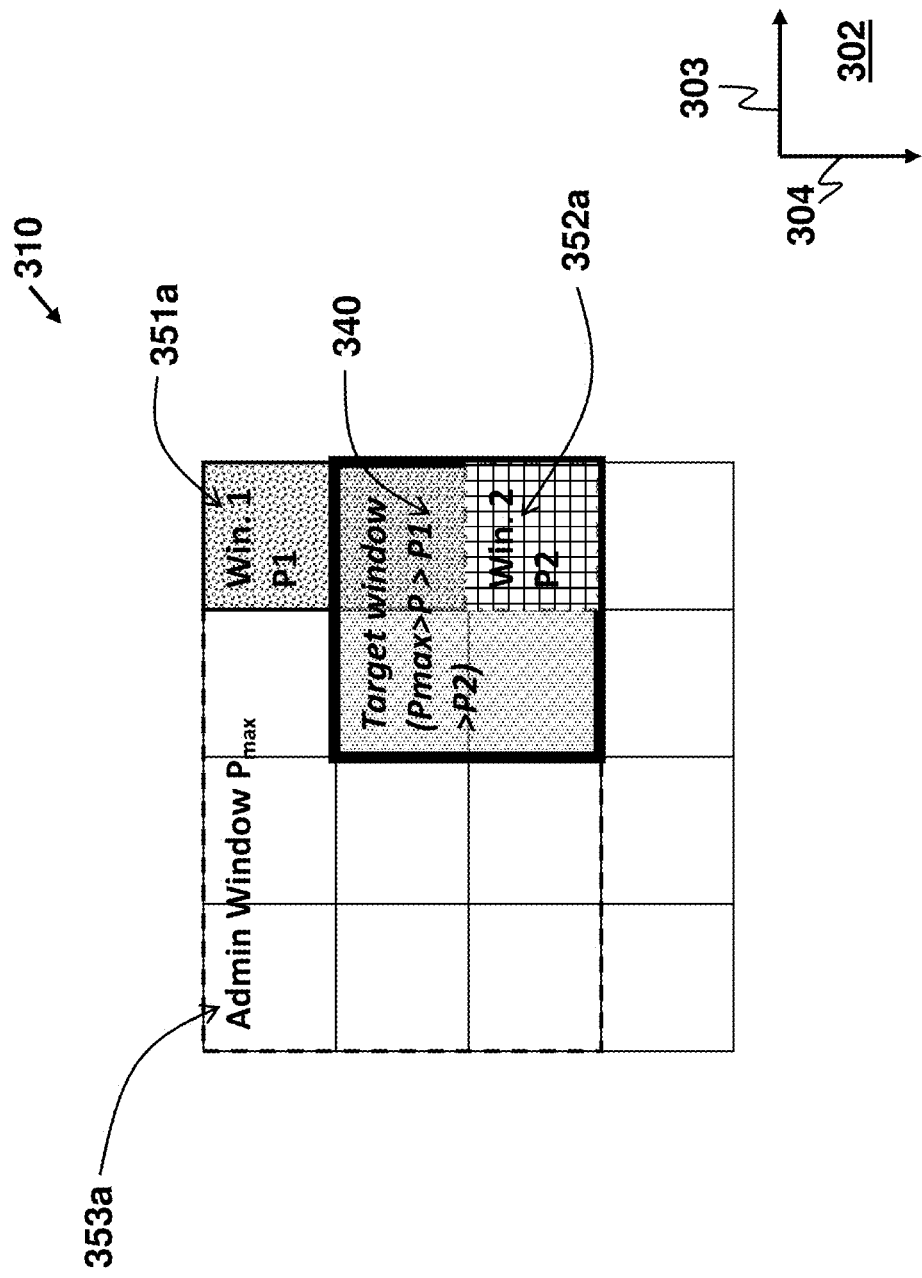
Figure 3E:
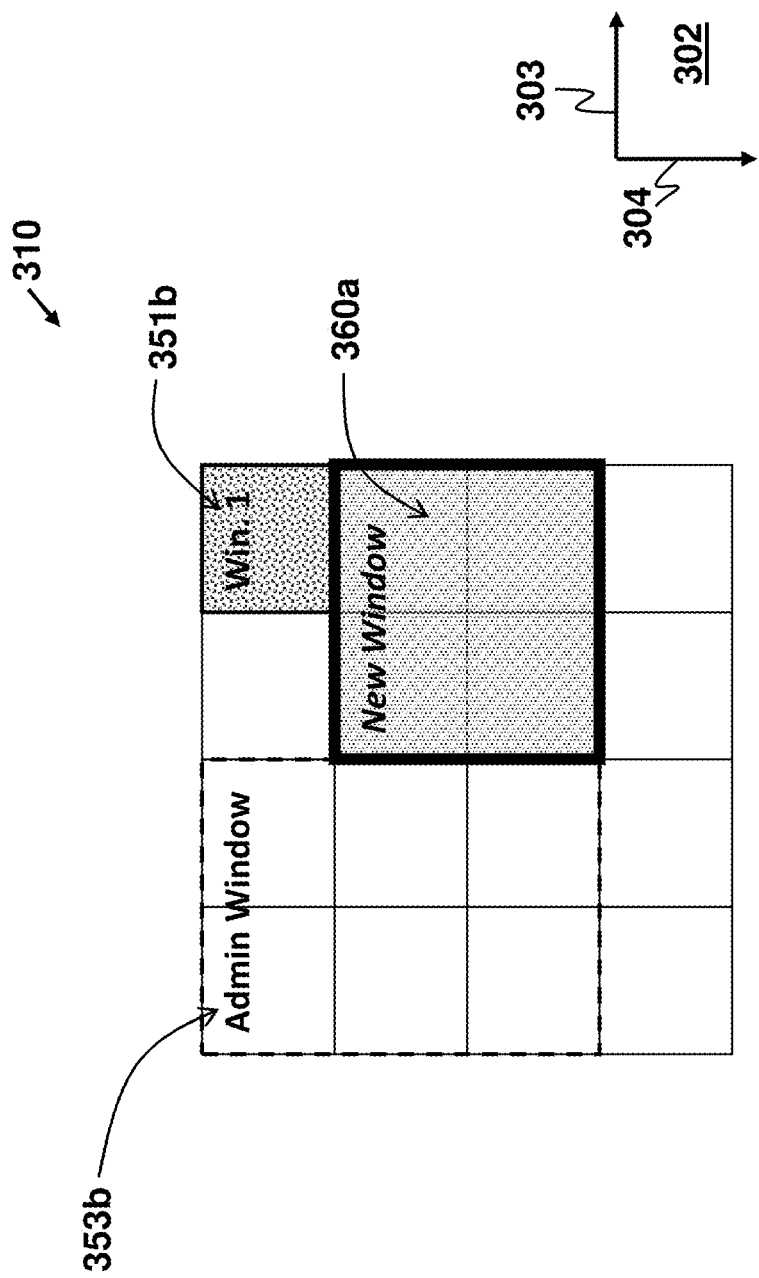

As an example for illustration, FIG. 3D shows an arrangement of display windows before adjusting already-allocated windows, and FIG. 3E depicts the arrangement of the display windows after the adjustment is done. In FIG. 3D, there are an administration window 353*a* with the priority value $P_{max}$, Window-1 351*a* with the priority value $P_1$, and Window-2 352*a* with the priority value $P_2$. The TW 340, with the priority value P as mentioned above, overlaps the administration window 353*a*, Window-1 351*a* and Window-2 352*a*. In a special case that $P_{max} > P > P_1 > P_2$, a permission is required for allowing the requesting user to use the TW 340. Assume that this permission is obtained. The administration window 353*a* is reduced in size to a resized administration window 353*b* shown in FIG. 3E. Window-1 351*a* is also reduced in size to a resized Window-1 351*b*. Window-2 352*a* is removed in the adjustment because the TW 340 covers the entire Window-2 352*a*.

In one embodiment, the adjustment of the one or more first windows so as not to overlap the target window is performed by window resizing or removing according to Algorithm 3b.

Algorithm 3b. Consider that the display window allocated to the k th user is formed by one or more of the grid-area units (rectangular sections) and is expressed as $A_k = \Sigma_{i \in I_k, j \in J_k} C_{i,j}$ with $I_k = \{i_k^{min}, \ldots, i_k^{max}\}$ and $J_k = \{j_k^{min}, \ldots, j_k^{max}\}$ where $i_k^{min}$, $i_k^{max}$, $j_k^{min}$ and $j_k^{max}$ are identifiable to those skilled in the art. The procedure of adjusting this already-allocated display window is as follows.

(3b.1) Compute $A_\delta = A_k \cap A$ so that $A_\delta$ is expressible as $A_\delta = \Sigma_{i \in I_\delta, j \in J_\delta} C_{i,j}$ where $I_\delta = \{i_\delta^{min}, \ldots, i_\delta^{max}\}$ and $J_\delta = \{j_\delta^{min}, \ldots, j_\delta^{max}\}$.

(3b.2) If $A_\delta \neq \phi$, then adjust $A_k$ to become an updated $A_k$ given by $$A_k = \max \left\{ \sum_{i=i_k^{min}}^{i_k^{max}} \sum_{j=j_\delta^{min}-1}^{j_\delta^{min}-1} C_{i,j}, \right.$$

$$\left. \sum_{i=i_k^{min}}^{i_\delta^{min}-1} \sum_{j=j_k^{min}}^{j_k^{max}} C_{i,j}, \sum_{i=i_k^{min}}^{i_k^{max}} \sum_{j=j_\delta^{max}+1}^{j_k^{max}} C_{i,j}, \sum_{i=i_\delta^{max}+1}^{i_k^{max}} \sum_{j=j_k^{min}}^{j_k^{max}} C_{i,j} \right\}.$$

The adjusting procedure is repeated for k=1 . . . n since there are n already-allocated display windows on the screen.

Note that in Algorithm 3b, all the n already-allocated display windows are checked regardless of whether they overlap the TW or not. Hence, a knowledge of which one of the already-allocated display windows overlaps the TW is not required before running Algorithm 3b. Also note that Algorithm 3b makes minimum reduction to an overlapping already-allocated display window by adjusting this already-allocated window to touch the TW, so that the resultant window of another user and the TW no longer overlap while this resultant window maintains the maximum size that is allowable.

Refer to FIG. 2B. After the TW is allocated to the requesting user as the new window (the step 270) and the updated set of allocated display windows is obtained, the allocated display windows contained in the updated set are tiled one by one (step 280), thereby refreshing the screen. The purpose of tiling the allocated display windows is to maximally use the screen by enlarging each display window as much as possible. As such, each display window having an original size is resized to a new size not less than the original size, or is maintained to have the original size if this display window is determined to be not resizable. Furthermore, tiling the window allocated to any first user having the priority value higher than any second user's priority value is performed before tiling the window allocated to the second user where the first and the second users are among the plural users. It follows that there is more "spare area" on the screen for expanding the window of the first user than there is when expanding the window of the second user. Thus, the first user is offered with an advantage of potentially using a greater portion of the screen than other users of lower priority.

Figure 3F:
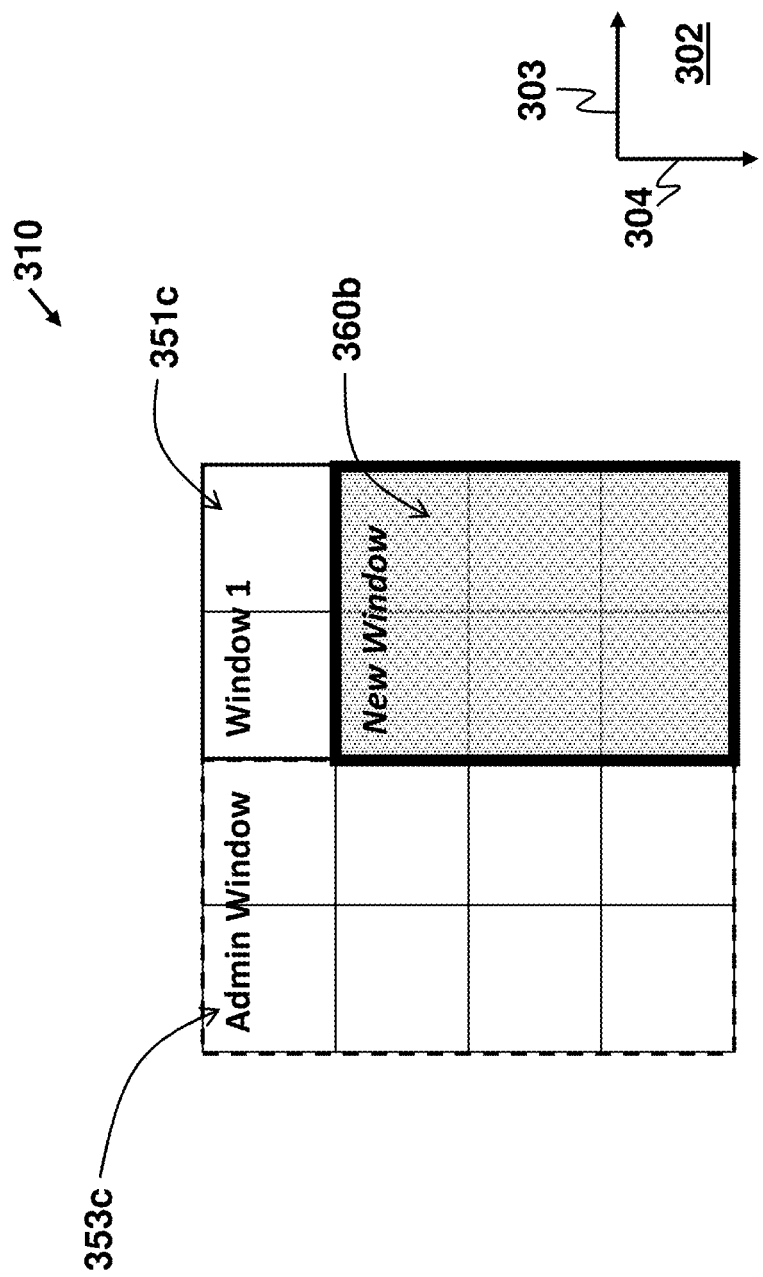

As an example for illustration, FIG. 3F shows the result of tiling the allocated windows in order to maximum usage percentage of the screen. The original windows before tiling are shown in FIG. 3E. Having the highest priority value among all the allocated windows, the administration window before tiling 353b becomes a bigger administration window 353c. Then the new window 360a allocated to the requesting user is expanded to a bigger one 360b. With the lowest priority value, the original Window-1 351b is resized at last, becoming a bigger Window-1 351c after tiling.

In one embodiment, the tiling of the allocated display windows contained in the updated set is performed according to Algorithm 4.

In the updated set, there are ñ users allocated with display windows (so that there are ñ display windows). The number ñ may or may not equal to n+1 because one or more already-allocated display windows may have been removed during the adjustment of already-allocated windows for not overlapping the TW. Then ñ users are sorted or re-arranged in a descending order of priority values to give a sorted list. Let $\psi$ be an ordering function such that $\psi(k)$ gives the position of the k th user in the sorted list of users. For example, if $\psi(k)=2$, then the k th user has the second highest priority value among all then ñ users. If it is desired to find out which user is in the k' th position in the sorted list, then compute $k=\psi^{-1}(k')$, whereby the k th user has the k' th position. As is mentioned above, $A_k$ is expressible as $A_k = \Sigma_{i \in I_k, j \in J_k} C_{i,j}$ where $I_k = \{i_k^{min}, \ldots, i_k^{max}\}$ and $J_k = \{j_k^{min}, \ldots, j_k^{max}\}$.

As used herein in the specification and appended claims, the symbol ∞ is used to denote a condition that an area on the screen is unused or not yet allocated.

Algorithm 4. The procedure of tiling the ñ allocated display windows in the updated set is as follows.

(4.1) While $$\left( \sum_{j \in J_k} C_{i_k^{min}-1,j} = \infty \right) \vee \left( \sum_{i \in I_k} C_{i,j_k^{min}-1} = \infty \right) \vee$$

$$\left( \sum_{j \in J_k} C_{i_k^{max}+1,j} = \infty \right) \vee \left( \sum_{i \in I_k} C_{i,j_k^{max}+1} = \infty \right)$$

is true, the following steps are performed:

(4.1.1) if $\Sigma_{j \in J_k} C_{i_k^{min}-1,j} = \infty$, then compute $A_k \cup \Sigma_{j \in J_k} C_{i_k^{min}-1,j}$ as an update to $A_k$ and thereby update $I_k$ and $J_k$;

(4.1.2) if $\Sigma_{i \in I_k} C_{i,j_k^{min}-1} = \infty$, then compute $A_k \cup \Sigma_{j \in J_k} C_{i,j_k^{min}-1}$ as an update to $A_k$ and thereby update $I_k$ and $J_k$;

(4.1.3) if $\Sigma_{j \in J_k} C_{i_k^{min}-1,j} = \infty$, then compute $A_k \odot \Sigma_{j \in J_k} C_{i_k^{min}-1,j}$ as an update to $A_k$ and thereby update $I_k$ and $J_k$; and (4.1.4) if $\Sigma_{i \in I_k} C_{i,j_k^{min}-1} = \infty$, then compute $A_k \odot \Sigma_{i \in I_k} C_{i,j_k^{min}-1}$ as an update to $A_k$ and thereby update $I_k$ and $J_k$.

(4.2) Perform (4.1) for k'=1, . . . , ñ strictly in such order with a value of k computed by $k=\psi^{-1}(k')$.

Notice that the steps (4.1.1)-(4.1.4) can be performed in any order. For example, if the steps (4.1.1), (4.1.2), (4.1.3) and (4.1.4) are performed in this order, Algorithm 4 is configured to expand a window by first checking if it is possible to expand the window by the left side thereof [the step (4.1.1)], then checking the top side thereof [the step (4.1.2)], followed by checking the right side of the window [the step (4.1.3)], and finally checking the bottom side thereof [the step (4.1.3)].

Figure 4:
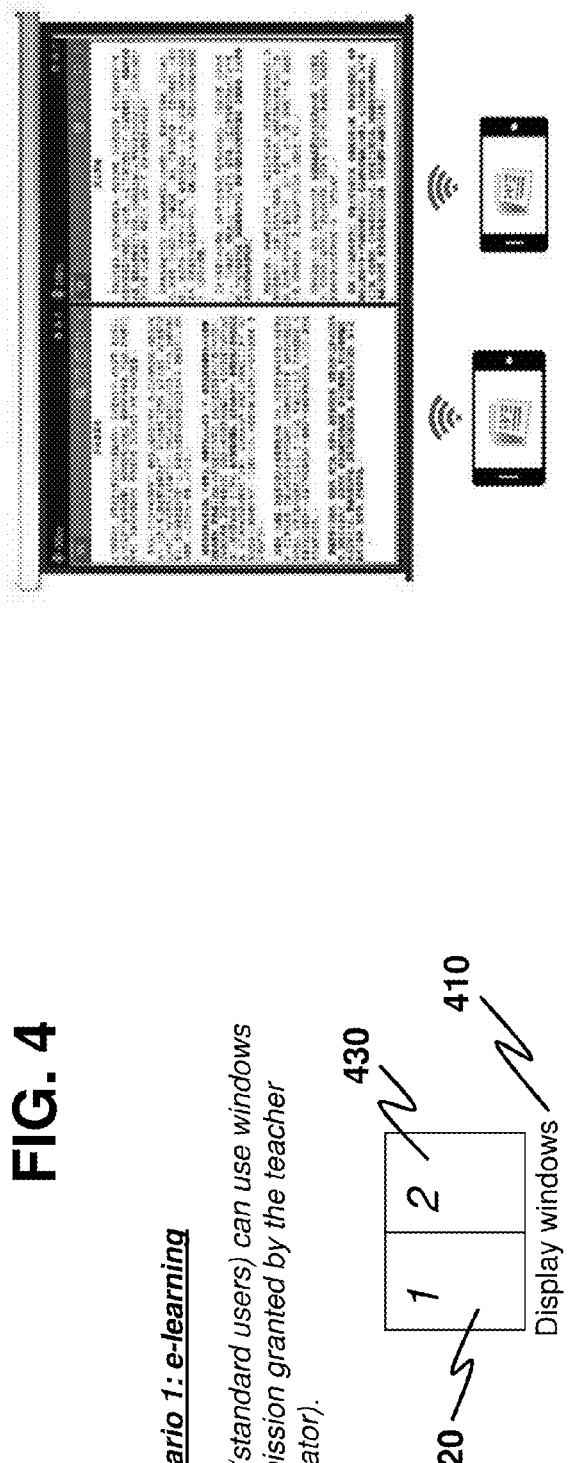
FIG. 4 is an example illustrating the use of the disclosed procedures to manage display windows on the same screen.

An example to illustrate the use of the disclosed method for display-window management in the presence of multiple users is provided in FIG. 4. FIG. 4 depicts a use scenario of e-learning, where students as standard users can use windows on the screen after permission is granted by a teacher, who is the administrator. There are two display windows 410 (Rectangular Section-1 420 and Rectangular Section-2 430) on the screen. There are one teacher (Teacher) and three students (Student A, Student B and Student C). Teacher, Student A, Student B and Student C have priority values of $P_a$, $P_s$, $P_s$ and $P_c$, respectively, where $P_a < P_s < P_c$. In a first time instant, Teacher requests to reserve Rectangular Section-1 420 and Rectangular Section-2 430, and both sections are allocated to Teacher. In a second time instant, Student A requests to use Rectangular Section-1 420. As Student A has a lower priority value than Teacher, Teacher is asked to grant a permission to Student A. In this example, the permission is granted. Then Student A is allowed to use Rectangular Section-1 420 while the display window used by Teacher is resized from both sections 420, 430 to only Rectangular Section-2 430. In a third time instant, Student B requests to use Rectangular Section-2 430. Again, Teacher is asked if a permission to use this section is granted to Student B. The permission is granted in this example. Consequently, Teacher's display window on Rectangular Section-2 430 is removed in order to allow Student B to use this rectangular section. In a fourth time instant, Student C, having the priority value lower than Student A's, requests to use Rectangular Section-1 420. In this example, Teacher, being the administrator, is asked to consider the request of Student C, and finally decides not to grant permission to Student C to use Rectangular Section-1 420. Hence, the request made by Student C is rejected.

As mentioned above, a screen-managing device is realizable by configuring the device to execute a process according to any of the embodiments of the method disclosed herein. An electronic display system is also realizable by comprising a screen and such screen-managing device.

The embodiments disclosed herein may be implemented using general purpose or specialized computing devices, computer processors, or electronic circuitries including but not limited to digital signal processors (DSP), application specific integrated circuits (ASIC), field programmable gate arrays (FPGA), and other programmable logic devices configured or programmed according to the teachings of the present disclosure. Computer instructions or software codes running in the general purpose or specialized computing devices, computer processors, or programmable logic devices can readily be prepared by practitioners skilled in the software or electronic art based on the teachings of the present disclosure.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A method for real-time managing multiple display windows on a screen by a screen-managing device that is communicable with plural users, an individual user being allowed to make a request to the screen-managing device to reserve an area on the screen even if the screen has one or more display windows already allocated to one or more other users, each of the users having a priority value indicating a level of right to use the screen, the method comprising:
    partitioning the screen into a plurality of grid-area units, whereby each of the display windows is formable by one or more of the grid-area units;
    upon receiving the request from a requesting user among the plural users, determining a target window formed by one or more of the grid-area units such that the target window at least covers the area specified in the request of the requesting user;
    determining whether the requesting user is permitted to use the target window;
    if the requesting user is permitted to use the target window, then:
        (a) if the target window does not overlap any already-allocated display window, then allocating the target window to the requesting user as a new window to thereby form an updated set of allocated display windows; and
        (b) if the target window overlaps one or more first windows among the already-allocated display windows, then adjusting the one or more first windows so as not to overlap the target window, and thereafter allocating the target window to the requesting user as a new window to thereby form an updated set of allocated display windows;
    and
    tiling the allocated display windows contained in the updated set one by one such that each display window having an original size is resized to a new size not less than the original size, or is maintained to have the original size if determined not resizable, wherein tiling the window allocated to any first user having the priority value higher than any second user's priority value is performed before tiling the window allocated to the second user where the first and the second users are among the plural users;
wherein:
    each of the grid-area units is a rectangular section of width $C_w$ and of height $C_h$; and
    the target window, denoted as A, is determined from the area, which has a width w, a height h, and a reference-location coordinate (x,y), by $A = \Sigma_{i \in I, j \in J} C_{i,j}$ where $$I = \left\{ \left\lfloor \frac{x}{C_w} \right\rfloor, \left\lfloor \frac{x}{C_w} \right\rfloor + 1, \ldots, \left\lfloor \frac{x+w}{C_w} \right\rfloor \right\},$$

$$J = \left\{ \left\lfloor \frac{y}{C_h} \right\rfloor, \left\lfloor \frac{y}{C_h} \right\rfloor + 1, \ldots, \left\lfloor \frac{y+h}{C_h} \right\rfloor \right\},$$

$\lfloor . \rfloor$ is a floor function, and $C_{i,j}$ is an (i,j) th rectangular section having a reference-location coordinate ($iC_w$, $jC_h$).

2. The method of claim 1, wherein whether the requesting user is permitted to use the target window is determined by checking whether any one of conditions is satisfied, wherein:
    a first one of the conditions is that the target window does not overlap any already-allocated display window; and
    a second one of the conditions is that the priority value of the requesting user is higher than the priority value of any other user having at least one already-allocated display window overlapped with the target window if the first condition is not satisfied.

3. The method of claim 2, wherein:
    a third one of the conditions is that an overriding permission is obtained by the requesting user to use the target window if the second condition is not satisfied.

4. The method of claim 1, wherein the adjusting of the one or more first windows includes resizing or removing an individual first window.

5. The method of claim 1, further comprising:
    assigning each of the plural users with the priority value thereof.

6. The method of claim 1, wherein the screen, having a width W and a height H, is partitioned into the plurality of grid-area units with $C_w = W/M_w$ and $C_h = H/M_h$ where $$M_w = \lceil 2\sqrt{N} - \lfloor \sqrt{N} \rfloor \rceil$$

is a first number of rectangular sections partitioning the screen along a reference horizontal direction and $$M_h = \lfloor \sqrt{N} \rfloor$$

is a second number of rectangular sections partitioning the screen along a reference vertical direction, in which $\lfloor . \rfloor$ is a floor function, $\lceil . \rceil$ is a ceiling function, and N is a positive integer pre-determined based on factors of an electronic display system that comprises the screen and the screen-managing device, the factors including a size of the screen.

7. The method of claim 1, wherein the determining of whether the requesting user is permitted to use the target window comprises:
repeating a checking step for k=1 ... n, wherein the checking step is characterized in that if $(A_k \cap A \neq \phi) \wedge (P_k \geq P)$ is true, then the request made by the requesting user is rejected, else this checking step is passed, where n is the number of the already-allocated display windows on the screen, $A_k$ is the display window allocated to the k th user, $P_k$ is the priority value of the k th user, P is the priority value of the requesting user, and $\phi$ is the null set; and
identifying that the target window is grantable to the requesting user if all the n checking steps are passed.

8. The method of claim 7, wherein the adjusting of the one or more first windows among the already-allocated display windows comprises the steps of:
(1) computing $A_\delta = A_k \cap A$ so that $A_\delta$ is expressed as $A_\delta = \Sigma_{i \in I_\delta, j \in J_\delta} C_{i,j}$ with $I_\delta = \{i_\delta^{min}, \ldots, i_\delta^{max}\}$ and $J_\delta = \{j_\delta^{min}, \ldots, j_\delta^{max}\}$, where $A_k$ is expressible as $A_k = \Sigma_{i \in I_k, j \in J_k} C_{i,j}$ in which $I_k = \{i_k^{min}, \ldots, i_k^{max}\}$ and $J_k = \{j_k^{min}, \ldots, j_k^{max}\}$;
(2) if $A_\delta \neq \phi$, then adjusting $A_k$ to become an updated $A_k$ given by $$A_k = \max\left\{ \sum_{i=i_k^{min}}^{i_k^{max}} \sum_{j=j_k^{min}}^{j_\delta^{min}-1} C_{i,j}, \sum_{i=i_k^{min}}^{i_\delta^{min}-1} \sum_{j=j_k^{min}}^{j_k^{max}} C_{i,j}, \sum_{i=i_k^{min}}^{i_k^{max}} \sum_{j=j_\delta^{max}+1}^{j_k^{max}} C_{i,j}, \sum_{i=i_\delta^{max}+1}^{i_k^{max}} \sum_{j=j_k^{min}}^{j_k^{max}} C_{i,j} \right\}$$

and
(3) repeating the steps (1) and (2) for k=1 ... n.

9. The method of claim 7, wherein when $A_k$ is expressible as $A_k = \Sigma_{i \in I_k, j \in J_k} C_{i,j}$ in which $I_k = \{i_k^{min}, \ldots, i_k^{max}\}$ and $J_k = \{j_k^{min}, \ldots, j_k^{max}\}$, the tiling of the allocated display windows contained in the updated set one by one comprises the steps of:
(4) while $(\Sigma_{j \in J_k} C_{i_k^{min}-1,j} = \infty) \vee (\Sigma_{i \in I_k} C_{i,j_k^{min}-1} = \infty) \vee (\Sigma_{j \in J_k} C_{i_k^{max}+1,j} = \infty) \vee (\Sigma_{i \in I_k} C_{i,j_k^{max}+1} = \infty)$ is true, performing:
if $\Sigma_{j \in J_k} C_{i_k^{min}-1,j} = \infty$, then computing $A_k \cup \Sigma_{j \in J_k} C_{i_k^{min}-1,j}$ as an update to $A_k$ and thereby updating $I_k$ and $J_k$;
if $\Sigma_{i \in I_k} C_{i,j_k^{min}-1} = \infty$, then computing $A_k \cup \Sigma_{i \in I_k} C_{i,j_k^{min}-1}$ as an update to $A_k$ and thereby updating $I_k$ and $J_k$;
if $\Sigma_{j \in J_k} C_{i_k^{max}+1,j} = \infty$, then computing $A_k \cup \Sigma_{j \in J_k} C_{i_k^{max}+1,j}$ as an update to $A_k$ and thereby updating $I_k$ and $J_k$; and
if $\Sigma_{i \in I_k} C_{i,j_k^{max}+1} = \infty$, then computing $A_k \cup \Sigma_{i \in I_k} C_{i,j_k^{max}+1}$ as an update to $A_k$ and thereby updating $I_k$ and $J_k$; and
(5) performing the step (4) for k'=1, ..., ñ strictly in such order with a value of k computed by $k = \psi^{-1}(k')$ where ñ is the number of allocated display windows contained in the updated set, and $\psi^{-1}$ is an inverse function of $\psi$, $\psi$ being an ordering function such that $\psi(k)$ gives the position of the k th user when the n users allocated with display windows are sorted in a descending order of priority values.

10. A screen-managing device for real-time managing multiple display windows on a screen where the screen-managing device is communicable with plural users each of which has a priority value indicating a level of right to use the screen and is allowed to make a request to the screen-managing device to reserve an area on the screen even if the screen has one or more display windows already allocated to one or more other users, wherein the screen-managing device comprises one or more processors configured to execute a process according to the method of claim 1.

11. A screen-managing device for real-time managing multiple display windows on a screen where the screen-managing device is communicable with plural users each of which has a priority value indicating a level of right to use the screen and is allowed to make a request to the screen-managing device to reserve an area on the screen even if the screen has one or more display windows already allocated to one or more other users, wherein the screen-managing device comprises one or more processors configured to execute a process according to the method of claim 2.

12. A screen-managing device for real-time managing multiple display windows on a screen where the screen-managing device is communicable with plural users each of which has a priority value indicating a level of right to use the screen and is allowed to make a request to the screen-managing device to reserve an area on the screen even if the screen has one or more display windows already allocated to one or more other users, wherein the screen-managing device comprises one or more processors configured to execute a process according to the method of claim 3.

13. A screen-managing device for real-time managing multiple display windows on a screen where the screen-managing device is communicable with plural users each of which has a priority value indicating a level of right to use the screen and is allowed to make a request to the screen-managing device to reserve an area on the screen even if the screen has one or more display windows already allocated to one or more other users, wherein the screen-managing device comprises one or more processors configured to execute a process according to the method of claim 4.

14. The screen-managing device of claim 10, wherein the screen-managing device is further configured to wirelessly receive the request from the requesting user.

15. The screen-managing device of claim 10, further comprising a communication interface configured to broadcast a current screen-content image, display-window location information, and application information of the plural users, and configured to handle user authentication.

16. An electronic display system comprising a screen and the screen-managing device of claim 10.

17. An electronic display system comprising a screen and the screen-managing device of claim 14.

18. An electronic display system comprising a screen and the screen-managing device of claim 15.

19. The electronic display system of claim 16, wherein the screen is a projector screen or is configured to emit light.

* * * * *